US011565339B2

(12) United States Patent
Radtke et al.

(10) Patent No.: US 11,565,339 B2
(45) Date of Patent: Jan. 31, 2023

(54) METHODS AND APPARATUS FOR WELDING ARC START ASSIST

(71) Applicant: Illinois Tool Works Inc., Glenview, IL (US)

(72) Inventors: David Edwin Radtke, New London, WI (US); Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 821 days.

(21) Appl. No.: 16/185,509

(22) Filed: Nov. 9, 2018

(65) Prior Publication Data

US 2019/0151976 A1 May 23, 2019

Related U.S. Application Data

(60) Provisional application No. 62/587,666, filed on Nov. 17, 2017.

(51) Int. Cl.
*B23K 9/10* (2006.01)
*H02J 7/14* (2006.01)
(Continued)

(52) U.S. Cl.
CPC .......... *B23K 9/1062* (2013.01); *B23K 9/1006* (2013.01); *F02D 41/1401* (2013.01);
(Continued)

(58) Field of Classification Search
CPC .. B23K 9/1043; B23K 9/1062; B23K 9/1075; B23K 9/1081; B23K 9/1006; B23K 9/091; B23K 9/0953
(Continued)

(56) References Cited

U.S. PATENT DOCUMENTS 5,198,698 A * 3/1993 Paul .................. H02J 9/08
307/64
7,297,899 B2 * 11/2007 Fosbinder ............ B23K 9/0953
219/130.21
(Continued)

FOREIGN PATENT DOCUMENTS

DE 102016004498 10/2016
JP 2001212668 8/2001
WO 2013054886 4/2013

OTHER PUBLICATIONS

PCT, Notification of Transmittal of the International Search Report and the Written Opinion of the International Searching Authority, or the Declaration, Application No. PCT/US2018/061485, dated Mar. 14, 2019, 6 Pages.

*Primary Examiner* — Phuong T Nguyen
(74) *Attorney, Agent, or Firm* — McAndrews Held & Malloy, Ltd.

(57) ABSTRACT

Apparatus and methods are provided for a welding-type power system that includes an engine comprising a starter battery. An electric generator is turned by the engine. A power bus connects an output of the generator to a welding-type output. A sensor measures a power demand on the power bus. A controller is configured to control the engine to adjust speed in response to a measured power demand on the power bus, and to control a converter to connect the starter battery to output power to the power bus in response to the measured power demand.

17 Claims, 3 Drawing Sheets

(51) Int. Cl.
  *F02D 41/14* (2006.01)
  *F02N 11/08* (2006.01)
  *H02J 7/00* (2006.01)
  *B23K 9/09* (2006.01)
  *B23K 9/095* (2006.01)

(52) U.S. Cl.
  CPC ...... *F02N 11/0814* (2013.01); *F02N 11/0866* (2013.01); *H02J 7/0068* (2013.01); *H02J 7/14* (2013.01); *B23K 9/091* (2013.01); *B23K 9/0953* (2013.01); *F02D 2250/24* (2013.01)

(58) Field of Classification Search
  USPC .............................................. 219/130.5, 133
  See application file for complete search history.

(56) References Cited

U.S. PATENT DOCUMENTS

| | | | | |
|---|---|---|---|---|
| 8,884,189 B2* | 11/2014 | Borchert | ............. | B23K 9/1043 |
| | | | | 219/137 PS |
| 10,202,968 B2* | 2/2019 | Peotter | ................. | F04B 49/225 |
| 2005/0161450 A1* | 7/2005 | Stava | .................... | B23K 9/324 |
| | | | | 219/133 |
| 2005/0263514 A1 | 12/2005 | Mbrecht | | |
| 2007/0187376 A1* | 8/2007 | Albrecht | ............... | B23K 9/1056 |
| | | | | 219/130.1 |
| 2008/0314885 A1 | 12/2008 | Hutchison | | |
| 2009/0101630 A1* | 4/2009 | Trinkner | ................ | B23K 9/1081 |
| | | | | 219/133 |
| 2009/0284022 A1* | 11/2009 | Usselman | ............... | F02D 29/06 |
| | | | | 290/38 R |
| 2010/0314181 A1* | 12/2010 | Beeson | ................. | B60K 25/02 |
| | | | | 180/53.5 |
| 2011/0006046 A1* | 1/2011 | Albrecht | ............... | B23K 9/1006 |
| | | | | 219/133 |
| 2014/0263238 A1* | 9/2014 | Ulrich | ................. | B23K 9/1012 |
| | | | | 219/130.21 |
| 2014/0263245 A1* | 9/2014 | Ulrich | ................. | B23K 9/1081 |
| | | | | 219/133 |
| 2014/0265569 A1 | 9/2014 | Yu | | |
| 2015/0069037 A1* | 3/2015 | Farah | .................. | B23K 9/1081 |
| | | | | 219/134 |
| 2016/0303677 A1* | 10/2016 | Furman | ................ | B23K 9/1081 |
| 2017/0036291 A1* | 2/2017 | Enyedy | ................ | B23K 9/1043 |
| 2017/0326670 A1 | 11/2017 | Enyedy | | |
| 2018/0036823 A1* | 2/2018 | Meckler | ............... | B23K 9/1043 |
| 2018/0123349 A1* | 5/2018 | Gleave | ................. | F02B 63/044 |
| 2019/0128230 A1* | 5/2019 | Ihde | ......................... | H02J 7/34 |

* cited by examiner

METHODS AND APPARATUS FOR WELDING ARC START ASSIST

CROSS REFERENCE TO RELATED APPLICATIONS

This application is a Non-Provisional Patent Application of U.S. Provisional Patent Application No. 62/587,666 entitled "Methods and Apparatus for Welding Arc Start Assist" filed Nov. 17, 2017, which is herein incorporated by reference in its entirety.

BACKGROUND

Conventional welding-type power supplies provide power for welding-type tools. Some such power supplies are coupled to a fossil fuel-powered engine that drives an electric generator. In some cases, the engine can include an integrated battery configured to store energy used to start the engine. A system that can increase the functionality of the starter battery would provide a more cost effective product, which is desirable.

SUMMARY

Apparatus and methods are disclosed of a welding-type power system configured to automatically start and/or stop in response to a demand for power from the system, substantially as illustrated by and described in connection with at least one of the figures, as set forth more completely in the claims.

In disclosed examples, a welding-type power system includes an engine comprising a starter battery, an electric generator configured to be turned by the engine, a power bus configured to connect an output of the generator to a welding-type output, a sensor configured to measure a characteristic of a power demand on the power bus, and a controller. The controller is configured to control the engine to adjust speed in response to a measured power demand on the power bus, and control the starter battery to output power to the power bus in response to the measured power demand.

In some examples, the measured power demand corresponds to an arc start of a welding-type tool. In examples, the engine is at an idling speed when the power demand is measured. In some examples, the system includes a boost converter configured to connect the starter battery to the power bus and to convert power from the starter battery to provide supplemental power to the power bus. The controller is configured to monitor the engine speed, and command a switch or other device (e.g., an electrically controlled contactor, a transistor, a semi-conducting field effect transistor such as a MOSFET, etc.) to end provision of power from the starter battery to the power bus in response to a signal indicating the engine has reached operating speed. The power from the starter battery to the power bus can also be controlled by disabling the boost converter in response to the signal.

In examples, the controller is configured to control a buck converter to connect the starter battery to the power bus in response to a signal indicating the starter battery is charged below capacity. In example, the controller is configured to control one of a switch or the buck converter to disconnect the starter battery from the power bus in response to a signal indicating the starter battery is charged to capacity.

In disclosed examples, the power bus is configured to provide welding-type power to the power output and to recharge the starter battery either simultaneously or independently. In some examples, the controller is configured to determine a power demand value at the power bus based on the measured power demand, and to compare the determined power demand value to a threshold power demand value.

In examples, the system includes a boost converter configured to connect the starter battery to the power bus and to convert power from the starter battery to the power bus to supplement welding-type power, the controller configured to control the engine and the boost converter in response to the comparison.

In some examples, the controller is configured to monitor the power bus voltage during a welding-type operation, identify a drop in voltage corresponding to a power demand value while the generator output is below the power demand value, and connect the starter battery to the power bus via the boost converter to provide additional power to establish an arc.

In examples, the engine comprises an alternator configured to charge the starter battery.

In disclosed examples, a method of operating a welding-type power system includes measuring, by a sensor, a power demand to and from a power bus connected to an output, adjusting, by a controller, an operating speed of an engine in response to the measured power demand, and controlling, by the controller, a boost converter to connect a starter battery of the engine to the power bus and to output power to the power bus in response to the measured power demand.

In some examples, the method includes monitoring, at the controller, a signal from the sensor indicative of the power demand, and determining, by the controller, the power demand based on the signal.

In some examples, the method includes identifying, by the controller, a characteristic of a power demand value corresponding to the adjusted engine speed and the starter battery output to the power bus, storing the characteristic of the power demand value in a memory storage device, and updating the stored characteristic of the power demand value based on usage trends of the system.

In examples, the method includes monitoring the engine speed, and disabling the boost converter in response to a signal indicating the engine has reached operating speed. In some examples, the method includes monitoring a charge level of the starter battery, and controlling the engine to provide power to the starter battery until the charge level reaches a threshold charge level.

In examples, the method includes controlling a buck converter to convert power from the power bus to battery-type power to recharge the starter battery.

In examples, the method includes an electric generator configured to be turned by the engine to provide welding-type power to the power bus.

In some examples, the power output from the combined engine and starter battery is greater than the individual operating output power of the engine or the starter battery alone.

DETAILED DESCRIPTION

Disclosed are examples of an engine driven welding-type power system that includes a starter battery, the system configured to control the starter battery to output power to a power bus based on a measured power demand to or from the power bus. In particular, the system employs a starter battery (e.g., a 12V or 24V battery and/or cranking system) or other type of energy storage device that is integrated with the engine to augment the power provided to an output of the system by the engine.

Engine driven welding systems can be employed to turn an electric generator used to power multiple welding-type tools (e.g., a welding-type torch, a wire feeder, a plasma torch, etc.), and can be in use for extended periods of time. When the system is not actively providing power to a tool, etc., the engine can be stopped (i.e. not rotating) or set to rotate at a low/idle speed.

Conventional engine driven welding-type systems may require operators to tap electrodes on work pieces to restart arc welding systems, or use an external device (e.g., a remote control) to start and stop an engine driven system, or change speed of the engine (e.g., increase speed from idle). Typically, the result was a degraded arc start and/or an operator would be required to take further action to start, restart (e.g., increase output) or stop the system. The result was that operators would miss one or more required steps to start or stop the engine; remotes would get lost and/or left in inconvenient places (and therefore go unused); and weld starts were degraded.

In examples, a power storage device (e.g., a 12V starter battery) can provide power to a power bus in some circumstances. For instance, if a power demand across the power bus is identified (e.g., an arc start) while the engine is stopped or operating at a low/idle speed, it may take time for the engine to increase to operating speed to satisfy the full power demand. During this time period, the starter battery can be connected to the power bus (e.g., via a boost converter) to augment/supplement the power generated by the engine until the engine reaches a desired operating speed. In some examples, the power from the starter battery can supplement the full operating power from the engine to provide a greater power output than the rated engine output. In this example, high power activities, such as clearing a short or a gouging operation, can be performed by augmenting the power output via the boost converter.

In some examples, a short period of higher power demand (e.g., a brief welding or cutting operation) can be identified while the engine is operating at a low/idle speed. In such a situation, the starter battery can be connected to the power bus during the operation, which provides the necessary power increase for the discrete increased power demand without raising the operating speed of the engine. In an example, the controller can determine the speed of the engine and receive a signal indicating a characteristic of the power demand indicates a need for increased power output. In this example, the starter battery can connect to the power bus, via boost converter, to supplement the power output for a short period of time without an exact calculation of either the power output from the engine or the power demand. Simply recognizing that a power demand exists may be sufficient to supplement the power output via the starter battery. For instance, the boost converter can provide power to the power bus for a predetermined amount of time. This example implementation therefore does not employ sensors to measure output of the engine, the starter battery, etc.

Maintaining a low and/or steady speed at the engine has multiple benefits, such as a reduction in fuel consumption, noise and emissions; increased engine life with the reduction in engine run time, which will improve engine performance and increase the life expectancy by reducing low load idle time.

A control circuit is configured to monitor and control when and how the battery is to be used to augment the power output at the power bus. This can be achieved by use of a boost converter configured to condition power from the starter battery to augment the power generated via a generator turned by the engine to satisfy the measured power demand. When not used to output power to the engine or the power bus, the starter battery is configured to be recharged by the engine alternator even at low/idling speeds.

Advantageously, the system operating characteristics would not change with the activation/deactivation of the starter battery/boost converter. The system operating characteristics would also not change with the engine running at different speeds. In particular, weld starts and stops, welding power and auxiliary power would be maintained and delivered at the same levels regardless of engine speed.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

Figure 1:
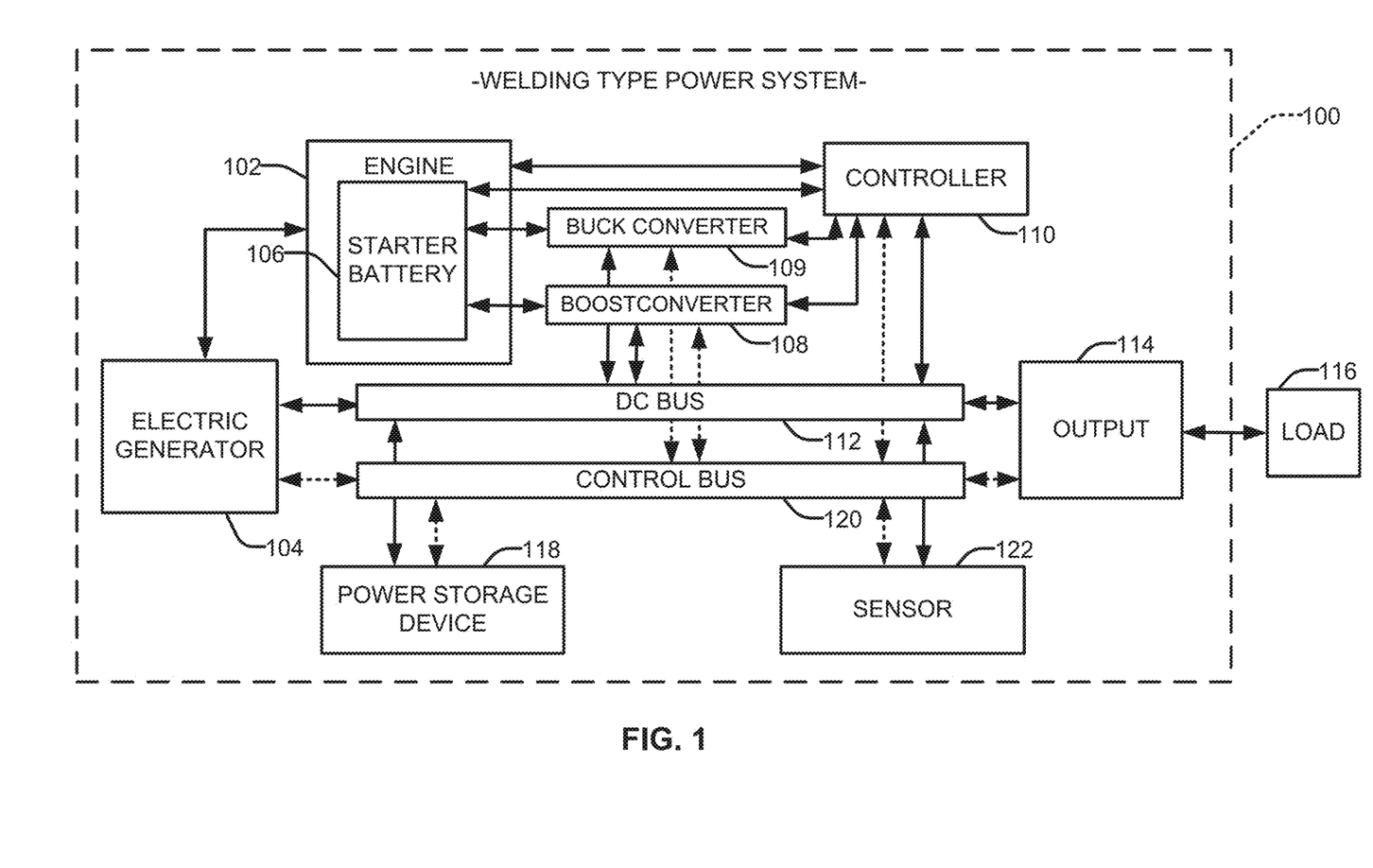
FIG. 1 is a block diagram of an example welding-type power system in accordance with aspects of this disclosure.

FIG. 1 is a block diagram of a welding-type power system 100. The example power system 100 includes an engine 102 connected to an electric generator 104 to feed a common electric power bus 112. The engine 102 can include a starter battery 106, which can be connected to a boost converter 108 and/or a buck converter 109, each of which is connected to both the power bus 112 and a control bus 120. In some examples, the starter battery 106 can be integrated with the engine 102, can be provided with a dedicated connection to the engine 102, and/or otherwise serve as a power input for activating the engine 102 (e.g., start and/or increase the engine 102 from idle speed, etc.). A controller 110 is connected to the engine 102, the starter battery 106, the boost converter 108 and the buck converter 109, and the control bus 120. A sensor 122 (e.g., one or more sensors) is connected to the power bus 112 to monitor changes in characteristics (e.g., voltage, current, resistance, etc.) associated with power demand across the power bus 112. Such changes can indicate power consumption and/or input from the electric generator 104, the boost converter 108, the buck converter 109, an output 114, and/or a power storage device 118, each of which is connected to the power bus 112 and the control bus 120.

A load 116 can connect to the system 100 via the output 114, which can include a rectifier to convert alternating current (AC), which periodically reverses direction, to direct current (DC), which flows in only one direction. The welding-type power system 100 can provide welding-type power to a welding-type torch (e.g., MIG, TIG, GMAW, FCAW, plasma cutter, etc.), a preheating device, a wire feeder, etc., as well as provide battery level power to charge a battery.

The system sensor(s) 122 monitors signals corresponding to, among other things, bus voltage, bus current and charge/discharge parameters. The information provided by the signal to the controller 110 is used to determine when the engine 102 and the starter battery 106 are to be employed to output power, for how long, at what level, etc.

Activating the engine 102 to generate power according to the determined power draw may be driven automatically by the controller 110. In an example, the presence or absence of a power draw, such as a load 116, and/or a change in the load 116 at the output 114, generates an automatic response by the controller 110 to activate a power source of the welding-type power system 100 for a specific power demand. Additionally or alternatively, the controller can periodically transmit a test signal to continually monitor the load 116 at the output 114 (e.g., to determine when a welding-type torch is present, or a rechargeable battery is fully charged).

In some examples, a measured power output at the power bus is identified by the controller 110 as having a value within the range of the current operating speed of the engine 102. Thus, no adjustment to the engine 102 is needed, nor is activation of the starter battery 106. If the measured power output indicates a need for an increase in power, the controller 110 can determine whether to increase a speed of the engine 102 and/or augment the power from the engine 102 by the starter battery 106. Based on one or more measured parameters (e.g., change in voltage, change in current, change in temperature, etc.), as well as historical data, the controller 110 can determine the type of power draw. For instance, if the controller 110 determines a quick cut operation is being conducted, the controller 110 can activate the boost converter 108 and draw power from the starter battery 106 to satisfy the brief increase in power demand without adjusting the speed of the engine 102. Similarly, clearing a short or a gouging operation can be performed by supplementing the power output with power from the starter battery.

If, however, the controller 110 determines a more significant increase in power demand (e.g., commencement of a particular welding type operation), the controller 110 can determine the speed of the engine 102 should be increased. The controller 110 can further determine if the starter battery 106 should be activated in order to aid in starting an arc (e.g., if the engine 102 is rotating at a low/idle speed), even if the engine 102 is increasing in speed. The controller 110 continues to monitor the power demand to and from the power bus 112, and will adjust the speed of the engine 102 and the activation and/or deactivation of the starter battery 106 accordingly. Thus, if the engine 102 reaches an appropriate operating speed to satisfy the measured power demand, the controller 110 will disable/turn off the boost converter 108 and therefore stop supplementing with power from the starter battery 106. The starter battery 106 can then connect to the engine 102 via the buck converter 109 to recharge while the engine 102 is rotating at normal operating speeds. The buck converter 109 can be a buck converter in some examples. In some examples, the buck converter 109 is integrated with the boost converter 108 (e.g., a bi-directional converter) or can be an independent converter.

In the example of FIG. 1, the power output 114 provides a port or terminal for the power supply 100 to provide power to the load 116. In an example, the power output 114 is configured for a particular type of connection (e.g., a welding-type torch cable), while in other examples the power output 114 can be modified to accept multiple types of connectors. In this example, the multi-mode power output 106 may be configured with multiple connection outputs, and/or one or more adapters to accommodate various loads 116 (e.g., a welding-type torch, a rechargeable battery, 120-volt power cord, etc.).

In an example, the system 100 would employ the power bus 112 (e.g., a common direct current (DC) bus) with a voltage sufficient to power a welding-type tool. In some examples, the power bus 112 can be converted to make 115 or 220 volts alternating current (VAC) to power auxiliary power components (e.g., a wire feeder), plasma cutters, a battery charger, and a compressed air system, as well as other systems. In disclosed examples, the starter battery 106 can be connected to the power bus 112 to power one or more of the auxiliary components or other systems, including turning an electric motor for a compressed air system. The common power bus 112 could connect to the switched mode power supply 112 (e.g., a power inverter) to condition the bus voltage. Thus, in some examples, systems such as plasma cutters use integrated inverters to run directly from the power bus 112.

In an example, the controller 110 can be configured as a processor or microcontroller, such as a programmable logic circuit, a system-on-chip, a programmable logic device, and/or any other type of logic circuit. The power output 114 may be implemented as a circuit using power semiconductors, electromechanical devices, and/or any other type(s) and/or combinations of switching device. For instance, the power output 114 can transfer power via power bus 112 and information between the load 116 and the power system 100 via the control bus 120.

Each component of system 100 connects to control bus 120 to convey information and/or commands, represented by dashed lines in FIG. 1. In this manner, information and control signals can be transmitted via a common bus, such that individual components do not require additional wiring or dedicated communication lines to communicate with each component. Additionally or alternatively, one or more component may be in direct communication with another component, for example, one or more of the various system components (e.g., the controller 110) can be directly linked to any one or more of the other components (e.g., the electric generator 104, the output 114, the sensor 122, etc.) to facilitate communication.

Additional and/or alternative parameters measured by the sensor 122 may provide information of the starter battery 106. Identified parameters of a particular battery may include a charge state of the starter battery 106, a nominal voltage of the starter battery 106 (e.g., an output voltage when the energy storage device is charged to capacity), and/or any other parameter that can be recognized in the signal, resistance, current, temperature, for example. The controller 110 controls the power system 100 output/source based on the identified parameter(s).

In examples, information regarding system usage trends can be monitored and stored. These stored trends can be used to predict when the controller 110 should control the engine 102 to start, stop or stay in a standby mode. Further, if demand at the load 116 is higher than peak demand of the engine 102, the controller 110 can automatically activate both the power storage device 118 and the engine 102 to generate additional power during high demand operations. Thus, both the engine 102 and the power storage device 118 can be activated at the same time for load conditions that would normally exceed the power delivery capabilities of the engine 102 alone.

In an example, the controller 110 communicates with the power output 114 to, for example, transmit a test signal to the load 116 and receive a feedback signal that indicates one or more parameters associated with the load 116, for example, a type and/or power requirements of the load 116. The controller 110 communicates with the welding-type power system 100 to control the type and amount of power provided to the power output 114, and/or receive data from the welding-type power system 100. Once the controller 110 processes the information from the sensor 122, the controller 110 will activate an appropriate power source for the measured power draw (e.g., the engine 102 to drive the electric generator 104, and/or the starter battery 106).

In some examples, the sensor 122 periodically and/or continually monitors for one or more conditions (e.g., a change in voltage at the load 116) to determine a change in the power demand at the load 116. If a change in power demand is detected by the controller 110, the controller 110 can control the engine 102 to start or stop. In low load situations, the engine 102 may remain off.

By communicating with the sensor 122, the controller 110 controls the welding-type power system 100 based on one or more current-voltage curves in accordance with power across the bus 112. In examples, the controller 110 responds to signals from the sensor 122, which represent a presence and a type of power draw. In response, the controller 110 can activate the engine 102 to drive the electric generator 104. Alternatively or additionally, the controller 110 can activate the starter battery 106.

In some examples, when the load 116 is a welding-type torch, the sensor 122 will measure a power draw associated with welding-type power. When the measured power draw indicates a different type of load (e.g., a rechargeable battery), the sensor 122 transmits a corresponding signal to the controller 110.

In some examples, one or both of the starter battery 106 and the power storage device 118 is a rechargeable battery pack (e.g., a lithium-ion battery, a nickel-metal hydride battery, lead-acid battery, etc.). In other examples, one or both of the starter battery 106 and the power storage device 118 is a hybrid battery module, a capacitor, a supercapacitor, or any other type of suitable storage device.

In a battery recharging operation, by monitoring the signal, the controller 110 can detect an end of a charging operation. In response to detecting the end of the charging operation (i.e., the feedback signal indicates the battery is fully charged), the controller 110 can command the system 100 to end provision of power to the output 114 and/or modify a sub-mode (e.g., change from a normal battery charging sub-mode to a trickle charging sub-mode). In this manner, the system 100 can automatically adjust to a change in the power needs of the load 116 (e.g., as the battery becomes fully charged).

Although shown with a single output 114, additionally and/or alternatively, the system 100 can employ multiple outputs. In some examples, each output can connect to the power bus 112 and the control bus 120. In other examples, one or more outputs can connect directly to one or more of the power sources. In each event, the controller 110 can selectively control the power provided to each output, such as in response to a measured parameter.

In some examples, the controller 110 can control the power supply 100 to provide power to the load 116 via the bus 112, while the starter battery 106 provides power directly to another load. Consistent with the disclosed examples, each of the loads can provide the same level of power (e.g., each operating in a welding mode or a battery recharging mode), or different levels of power. In this example, the load 116 can be operating in a welding mode, and another load can be powering a rechargeable battery. In yet another example, the output 114 provides auxiliary 115or 220 VAC power during a welding operation to power, e.g., lights, a grinder, a battery charger, etc.

In some examples, the system 100 can include an interface (e.g., a switch, a computer input device, etc.) to provide option for an operator to control a function of the power sources and/or outputs at the system 100. Additionally or alternatively, the user interface can include a list of operations with either a set of known parameters, or a list of operations that correspond to a learned operation. Thus, the known or historical actions and conditions during a particular operation will aid in the determination of when to start, stop or adjust a speed of the engine 102, as well as when to draw power from the starter battery 106 to supplement power at the power bus 112 via the boost converter 108.

Figure 2:
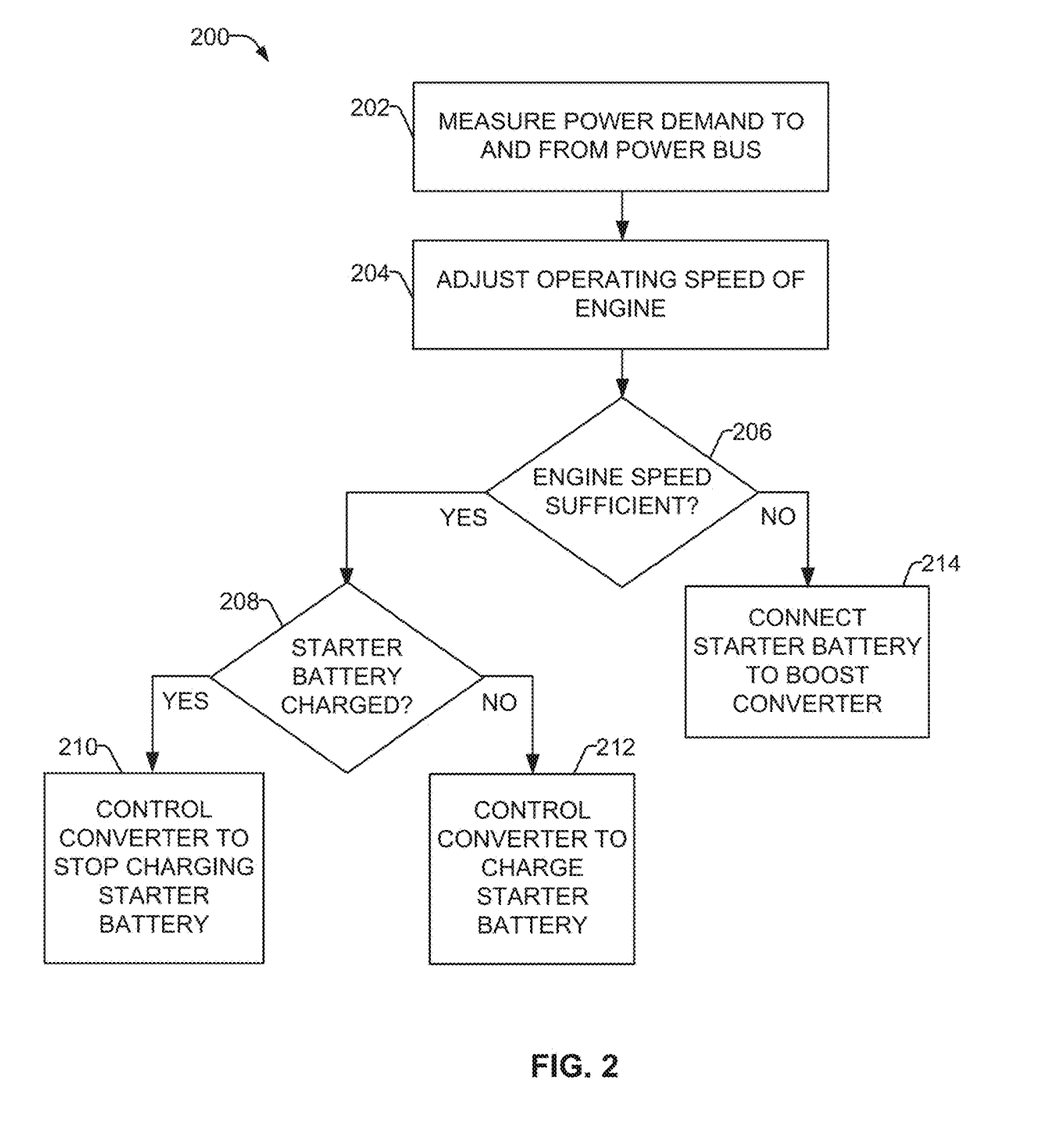
FIG. 2 illustrates an example method of operating a welding-type power system in accordance with aspects of this disclosure.

FIG. 2 is a flowchart illustrating example method 200 of operating a welding-type power system, for example, the welding-type power system 100 of FIG. 1. The method 100 of FIG. 2 may be implemented by the controller 110 of FIG. 1 by executing machine-readable instructions, such as stored on a non-transitory machine-readable storage device. At block 202, a sensor (e.g., the sensor 122) measures a power demand to and from a power bus (e.g., the power bus 112). At block 204, a controller (e.g., the controller 110) adjusts an operating speed of an engine (e.g., the engine 102) based on the measured power demand. At block 206, the controller determines if the engine output corresponding to the engine speed is sufficient to satisfy the measured power demand. If the engine output is sufficient, at block 208 the controller determines whether a starter battery (e.g., starter battery 106) of the engine is charged. If the starter battery is sufficiently charged, at block 210 no power is drawn from the starter battery to supplement the power bus, such as by disabling/turning off the converter. If the starter battery is not charged sufficiently, the controller controls the buck converter (e.g., the buck converter 109) to charge the starter battery. In some examples, the starter battery is charged by an alternator of the engine at block 212.

Returning to block 206, if the output from the engine is not sufficient to satisfy the measured power demand, the controller controls a boost converter (e.g., boost converter 108) to draw power from the starter battery to provide supplemental power at the power bus at block 214 to satisfy the measured power demand from the power bus. In this manner, the system is configured to employ a starter battery of an engine to augment power at an output based on a measured power demand.

Figure 3:
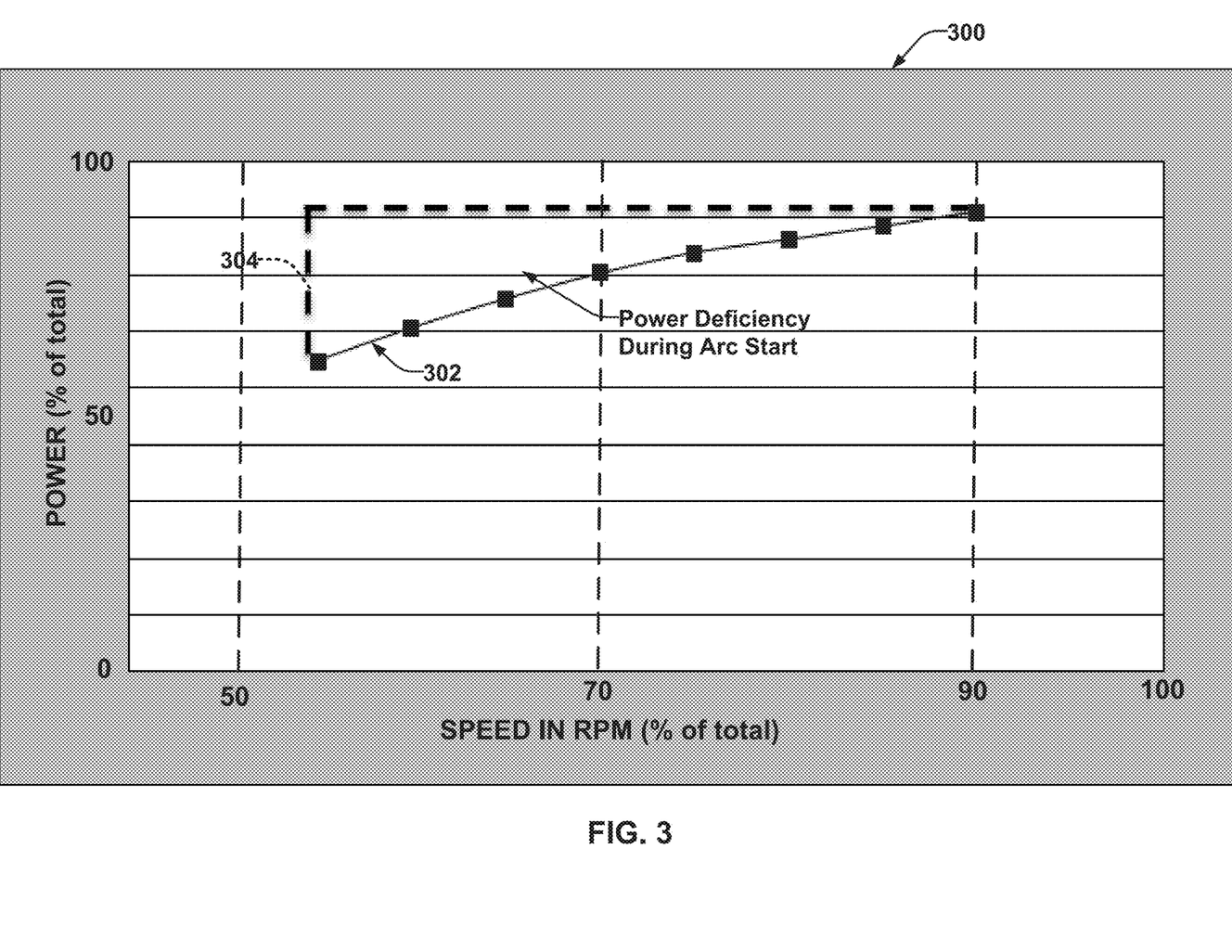
FIG. 3 illustrates example graphical representation of an engine output during operation of a welding-type power system in accordance with aspects of this disclosure.

FIG. 3 illustrates an example graphical representation 300 of the engine speed in rotations per minute (rpm) versus power output during operation of a welding-type power system, in accordance with aspects of this disclosure. As shown, the rpm and power outputs are represented as a percentage of the total (e.g., maximum capacity, rated capacity, user determined limits, normal operating limits, etc.) rpm and power output for an engine. Although represented in a particular level of rpms and power output, the graphical representation 300 is illustrative of one of many example ranges, which can vary based on a type of engine, welding or other process being performed, as well as other relevant factors known to one of skill in the art.

FIG. 3 is a representation of an engine (e.g., engine 102) turning at an idle speed at approximately 55% of the maximum rpm, and about 60% of maximum power output, as shown by line 302. The line 302 shows an increase in both rpm and power output, such as in response to a power draw (e.g., an arc start). At idle speed, the power output from the engine is insufficient to satisfy the power demand (e.g., arc start), thus a power deficit is created, shown as the area above the line 302 and the dashed line represented by 304.

In accordance with examples of the present disclosure, a battery (e.g., starter battery 106 and/or the power storage device 118) can be activated (e.g., via boost converter 108) to assist in generating power. In response, the engine speed increases as shown via line 302, until the speed reaches a suitable level, approximately 90% of the maximum rpm in this example. Furthermore, when the power demand is from an arc-welding tool, the lack of power can cause a short. In this example, reaching a 90% power output is sufficient to clear the short, and normal operations can be maintained.

As described herein, the systems and methods provide improved arc starts, especially at with high amperage electrodes, and offers advantages for short clearing while welding. Moreover, employing the integrated starter battery to augment power output of the system is a cost effective solution to improved arc starts on an engine drive.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
an engine comprising a starter battery;
an electric generator configured to be turned by the engine;
a power bus configured to connect an output of the generator to a welding-type output;
a sensor configured to measure a characteristic of a power demand on the power bus;
a bi-directional converter configured to connect the starter battery to the power bus and to convert power from the starter battery to provide supplemental power to the power bus; and
a controller configured to:
control the engine to adjust speed in response to a measured power demand on the power bus; and
control the starter battery to output power to the power bus in response to the measured power demand.

2. The system of claim 1, wherein the measured power demand corresponds to an arc start of a welding-type tool.

3. The system of claim 1, wherein the engine is at an idling speed when the power demand is measured.

4. The system of claim 1, the bi-directional converter comprising a boost converter.

5. The system of claim 4, wherein the controller is configured to:
monitor the engine speed; and
command the starter battery to end provision of power to the power bus by disabling one of a switch or the boost converter in response to a signal indicating the engine has reached operating speed.

6. The system of claim 4, wherein the bi-directional converter further comprises a buck converter, the controller configured to control the buck converter to connect the starter battery to the power bus in response to a signal indicating the starter battery is charged below capacity.

7. The system of claim 6, wherein the controller is configured to control the buck converter to disconnect the starter battery from the power bus in response to a signal indicating the starter battery is charged to capacity.

8. The system of claim 1, wherein the power bus is configured to provide welding-type power to the power output and to recharge the starter battery simultaneously or independently.

9. The system of claim 1, wherein the controller is configured to:
determine a power demand value at the power bus based on the measured power demand; and
compare the determined power demand value to a threshold power demand value.

10. The system of claim 9, the bi-directional converter further comprising a boost converter, the controller configured to control the engine and the boost converter in response to the comparison.

11. The system of claim 1, wherein the controller is configured to:
monitor the power bus voltage during a welding-type operation;
identify a drop in voltage corresponding to a power demand value while the generator output is below the power demand value; and
connect the starter battery to the power bus via the bi-directional converter to provide additional power to establish an arc.

12. The system of claim 1, wherein the engine comprises an alternator configured to charge the starter battery.

13. The system of claim 1, wherein the starter battery is a 12V or 24V battery.

14. The system of claim 1, wherein the starter battery is a cranking system to start the engine.

15. A welding-type power system, comprising:
an engine comprising a starter battery integrated with the engine and configured to provide power to crank the engine to start;
an electric generator configured to be turned by the engine;
a power bus configured to connect an output of the generator to a welding-type output;
a sensor configured to measure a characteristic of a power demand on the power bus;
a buck or boost converter configured to connect the starter battery to the power bus and to convert power from the starter battery to provide supplemental power to the power bus; and
a controller configured to:
control the engine to adjust speed in response to a measured power demand on the power bus; and
control the starter battery to output power to the engine or the power bus in response to the measured power demand.

16. The system of claim 15, wherein the starter battery is a rechargeable battery pack comprising a lithium-ion battery, a nickel-metal hydride battery, or lead-acid battery.

17. The system of claim 15, wherein the starter battery is a hybrid battery module, a capacitor, or a supercapacitor.

* * * * *